(12) United States Patent  (10) Patent No.: US 10,710,292 B2
Yamasaki et al.  (45) Date of Patent: Jul. 14, 2020

(54) SKIN-EQUIPPED HOLLOW MOLDED ARTICLE AND METHOD OF PRODUCING THE SAME

(71) Applicant: KYORAKU CO., LTD., Kyoto (JP)

(72) Inventors: Yoshihiro Yamasaki, Kanagawa (JP); Kazuhiko Saeki, Aichi (JP)

(73) Assignee: KYORAKU CO., LTD., Kyoto (JP)

( * ) Notice: Subject to any disclaimer, the term of this patent is extended or adjusted under 35 U.S.C. 154(b) by 177 days.

(21) Appl. No.: 15/535,194

(22) PCT Filed: Dec. 9, 2015

(86) PCT No.: PCT/JP2015/084486
§ 371 (c)(1),
(2) Date: Jun. 12, 2017

(87) PCT Pub. No.: WO2016/093263
PCT Pub. Date: Jun. 16, 2016

(65) Prior Publication Data
US 2017/0368734 A1 Dec. 28, 2017

(30) Foreign Application Priority Data
Dec. 11, 2014 (JP) ................................. 2014-250862

(51) Int. Cl.
*B29C 49/20* (2006.01)
*B29C 49/50* (2006.01)
(Continued)

(52) U.S. Cl.
CPC .............. *B29C 49/20* (2013.01); *B29C 33/12* (2013.01); *B29C 43/203* (2013.01); *B29C 49/04* (2013.01);
(Continued)

(58) Field of Classification Search
CPC ...... B29C 2049/203; B29C 2049/2017; B29C 51/12; B29C 49/20;
(Continued)

(56) References Cited

U.S. PATENT DOCUMENTS 6,451,417 B1 * 9/2002 Sumi ..................... B32B 27/12
428/292.1
2012/0024459 A1 2/2012 Igarashi
(Continued)

FOREIGN PATENT DOCUMENTS

FR 2918915 A1 * 1/2009 ......... B29C 49/0047
JP S62-122733 A 6/1987
(Continued)

OTHER PUBLICATIONS

Machine translation of Japanese Patent Publication No. JP-2013075555A, originally published Apr. 25, 2013 (Year: 2013).*
(Continued)

*Primary Examiner* — Philip C Tucker
*Assistant Examiner* — Vicki Wu
(74) *Attorney, Agent, or Firm* — Troutman Sanders LLP

(57) ABSTRACT

An object of the present invention is to produce a double-sided carpet type skin-equipped hollow molded article so as to prevent degradation of aesthetic appearance of the hollow molded article. The double-sided carpet type skin-equipped hollow molded article includes: a hollow molded article main body made of a thermoplastic and having a front surface wall and a back surface wall; and skins integrally bonded to the respective front and back surface walls. A first skin bonded to the front surface wall is a napped-type skin. A second skin bonded to the back surface wall is a skin having a thickness smaller than a thickness of the first skin. A wall surface to which the first skin is bonded protrudes outward more than a wall surface to which the second skin (Continued)

is bonded in a parting line of the hollow molded article main body. The first skin has a large thickness and is a napped-type skin. Therefore, obtained is an effect that a nap raised after deburring and cutting masks a cut portion.

5 Claims, 4 Drawing Sheets

(51) Int. Cl.
*B29C 49/04* (2006.01)
*B29C 33/12* (2006.01)
*B29C 43/20* (2006.01)
*B29C 49/48* (2006.01)
*B29C 48/10* (2019.01)
*B29C 48/00* (2019.01)
*B29L 31/30* (2006.01)

(52) U.S. Cl.
CPC .............. *B29C 49/48* (2013.01); *B29C 49/50* (2013.01); *B29B 2911/14633* (2013.01); *B29C 48/0011* (2019.02); *B29C 48/10* (2019.02); *B29L 2031/3017* (2013.01)

(58) Field of Classification Search
CPC ........... B29C 2049/2004–2095; B29C 49/541; B29C 33/005; B29C 2049/0057; B29C 2049/4805; B29C 2049/4812

USPC .................................................... 156/244.11
See application file for complete search history.

(56) References Cited

U.S. PATENT DOCUMENTS

2013/0278018 A1* 10/2013 Preisler .................. B62D 25/20
  296/193.07
2014/0147638 A1* 5/2014 Nonaka ................. B60R 13/011
  428/177

FOREIGN PATENT DOCUMENTS

| JP | H01-105723 A | 4/1989 | | |
|----|----|----|----|----|
| JP | 2008-055806 A | 3/2008 | | |
| JP | 2009-132028 A | 6/2009 | | |
| JP | 2012-025114 A | 2/2012 | | |
| JP | 2012-081627 A | 4/2012 | | |
| JP | 2013-075555 A | 4/2013 | | |
| JP | 2013075555 A | * 4/2013 | ........... B60R 13/011 |
| WO | 2016/093263 A1 | 6/2016 | | |

OTHER PUBLICATIONS

International Search Report dated Mar. 1, 2016 during the prosecution of International Application No. PCT/JP2015/084486.

* cited by examiner

SKIN-EQUIPPED HOLLOW MOLDED ARTICLE AND METHOD OF PRODUCING THE SAME

CROSS-REFERENCE TO RELATED APPLICATIONS

This is a U.S. national phase application under 35 U.S.C. § 371 of International Patent Application No. PCT/JP2015/084486, filed on Dec. 9, 2015, and claims benefit of priority to Japanese Patent Application No. 2014-250862, filed Dec. 11, 2014. The entire contents of these applications are hereby incorporated by reference.

FIELD OF THE INVENTION

The present invention relates to a skin-equipped hollow molded article, which is made of a thermoplastic and includes skins integrally bonded to a front surface wall and a back surface wall of a hollow molded article main body, and a method of producing the same. The present invention particularly relates to a new technique for improving aesthetic appearance in a parting line.

BACKGROUND

A skin-equipped hollow molded article is widely used for, for example, automobile interior articles such as a cargo floor panel (cover panel or luggage board in luggage space of automobile) and a rear parcel shelf and panel-like building articles such as an interior wall partition and a door. The skin-equipped hollow molded article is a molded article whose appearance and sense of touch are improved by bonding a fiber sheet to a front surface wall of the hollow molded article. This hollow molded article is produced by subjecting a thermoplastic to blow molding.

In production of the skin-equipped hollow molded article, it is necessary to prevent degradation of aesthetic appearance. However, in a case of employing a method in which a hollow molded article is molded by overlapping a thermoplastic parison and a skin material, a cut surface of the hollow molded article is exposed due to deburring, which is problematic. In blow molding, it is necessary to perform cutting and deburring along a pinched-off parting line after molding, and a cut surface is inevitably exposed after cutting.

In view of this, in order to minimize degradation of aesthetic appearance, there has conventionally been attempted performing molding so that a wall surface of a back surface wall protrudes outward more than a wall surface of a front surface wall in a parting line (for example, see JP-A-62-122733 and JP-A-2008-55806).

In an invention disclosed in JP-A-62-122733, in a parting line of a hollow molding die, a pinch-off portion on a fabric (skin) side is provided on an inner side of a pinch-off portion on the other side. In this way, a root of a burr portion becomes thin, and therefore deburring is easily performed. In addition, a surface of an end portion of the fabric is provided at the same position as that of a surface of a thermoplastic exposed portion or on an inner side of the surface. Therefore, it is possible to prevent the end portion of the fabric from peeling off at the time of assembly or use.

JP-A-2008-55806 discloses a skin-equipped hollow molded article including: a hollow molded article main body made of a thermoplastic and having a front surface wall and a back surface wall; and a skin integrally bonded to the front surface wall. When a protrusion portion protruding outward more than a side surface wall is formed at an outer edge of the hollow molded article main body so that a terminal end of the skin is integrally bonded to the protrusion portion, moldability becomes favorable.

SUMMARY OF THE INVENTION

By the way, as a skin-equipped hollow molded article, a single-sided carpet type molded article in which a skin material is attached only to a front surface wall has been mainly used so far. However, the use of a double-sided carpet type molded article in which a skin material is attached to both sides has been increased for the purpose of, for example, further improving aesthetic appearance and texture.

However, when a method of producing a single-sided carpet type hollow molded article is employed as it is for producing a double-sided carpet type skin-equipped hollow molded article, there arises a problem that a molded article having favorable appearance cannot always be obtained. For example, when a double-sided carpet type skin-equipped hollow molded article that is molded so that a wall surface of a back surface wall protrudes outward more than a wall surface of a front surface wall is subjected to deburring, an end portion of a skin of the back surface wall of the shape is scraped.

Therefore, a plastic exposed surface is increased. As a result, aesthetic appearance may be degraded.

The present invention has been proposed in view of such conventional circumstances. That is, an object of the present invention is to provide a technique (skin-equipped hollow molded article and method of producing the same) capable of minimizing degradation of aesthetic appearance even in a case where the technique is applied to a double-sided carpet type skin-equipped hollow molded article.

To achieve the above object, a skin-equipped hollow molded article of the present invention includes: a hollow molded article main body made of a thermoplastic and having a front surface wall and a back surface wall; and skins integrally bonded to the respective front and back surface walls. A first skin bonded to the front surface wall is a napped-type skin; a second skin bonded to the back surface wall has a thickness smaller than a thickness of the first skin; and a wall surface to which the first skin is bonded protrudes outward more than a wall surface to which the second skin is bonded in a parting line of the hollow molded article main body.

A method of producing a skin-equipped hollow molded article of the present invention is a method of producing a skin-equipped hollow molded article including: a hollow molded article main body made of a thermoplastic and having a front surface wall and a back surface wall; and skins integrally bonded to the respective front and back surface walls. The method includes: using a napped-type skin as a first skin bonded to the front surface wall; using a skin having a thickness smaller than a thickness of the first skin as a second skin bonded to the back surface wall; and at the time of subjecting a parison to compression molding by placing the parison and the first and second skins between split mold blocks and clamping the split mold blocks, performing molding so that a wall surface to which the first skin is bonded protrudes outward more than a wall surface to which the second skin is bonded and removing a burr.

In the present invention, the wall surface to which the first skin is bonded protrudes outward more than the wall surface to which the second skin is bonded in the parting line of the hollow molded article main body. When deburring is performed in such a state, the second skin of the back surface wall is not scraped.

At the time of deburring, an end portion in the vicinity of the parting line of the first skin of the front surface wall may be scraped. However, the first skin has a large thickness and is a napped-type skin. Therefore, obtained is an effect that a nap raised after deburring and cutting masks a cut portion. This is also experimentally confirmed. Thus, the cut portion becomes inconspicuous, and therefore aesthetic appearance is not degraded.

According to the present invention, a resin cut surface formed along a parting line is inconspicuous. Therefore, it is possible to provide a skin-equipped hollow molded article having excellent aesthetic appearance.

DETAILED DESCRIPTION

Hereinafter, an example of a skin-equipped hollow molded article to which the present invention is applied and a method of producing the same will be described in detail by using an automobile deck board as an example with reference to the drawings.

Figure 1:
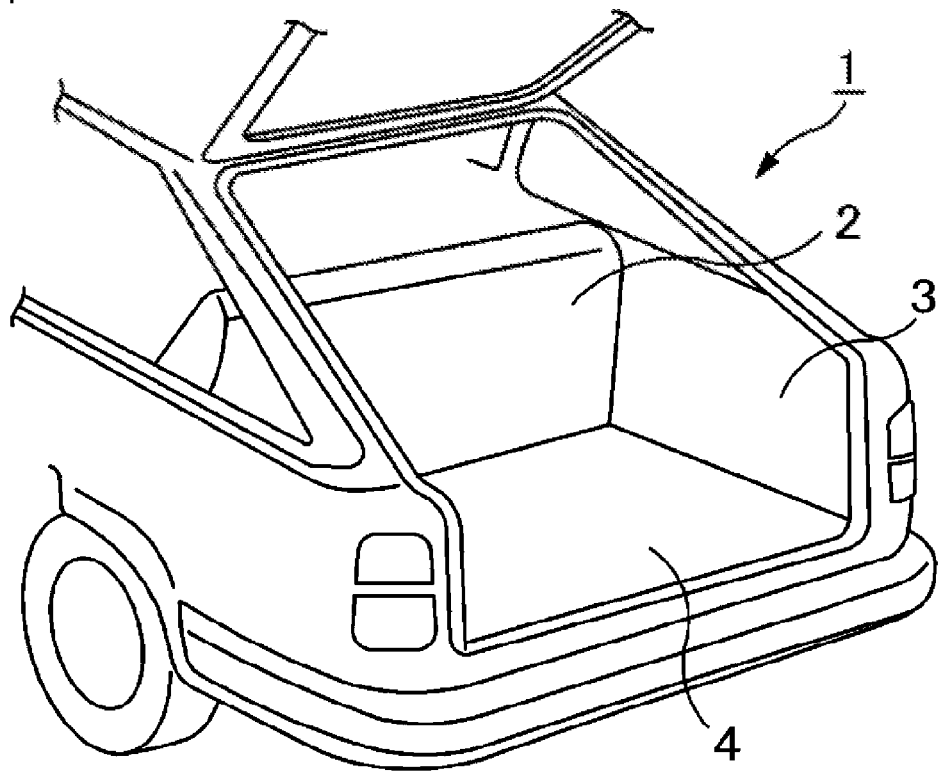
FIG. 1 is a main-part schematic perspective view of an example of attaching an automobile deck board.

A skin-equipped hollow molded article in this example is used as a deck board placed in a luggage space of an automobile. As shown in FIG. 1, a luggage space 3 is provided behind a back seat 2 of an automobile 1. As a deck board constituting a floor surface thereof, a skin-equipped hollow molded article 4 in this example is used.

Figure 2:
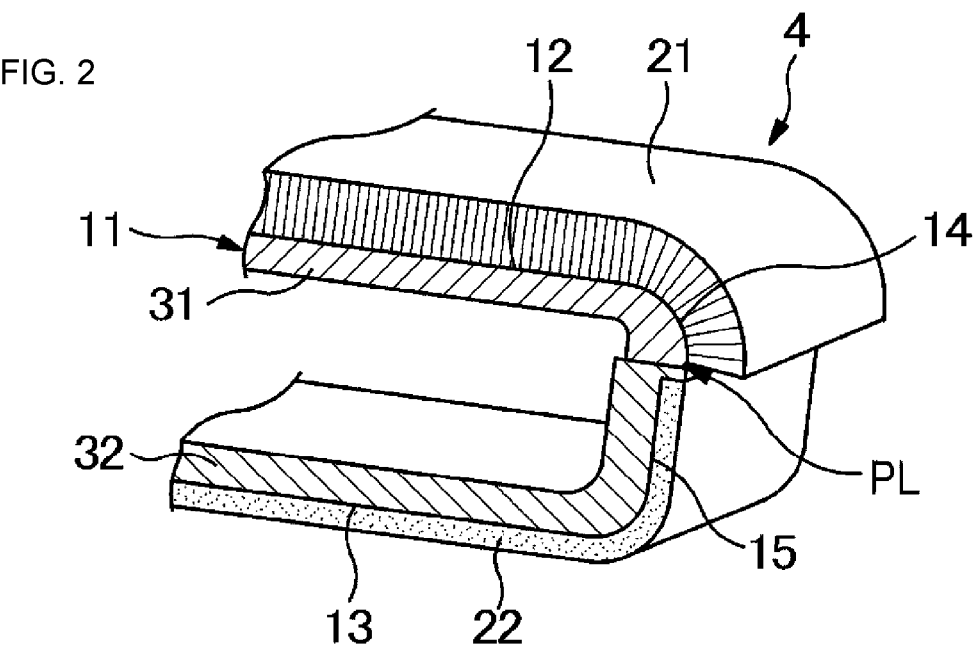
FIG. 2 is a schematic perspective view of a broken-out part of a skin-equipped hollow molded article (deck board) according to this example.

As shown in FIG. 2, the skin-equipped hollow molded article 4 includes: a plate-like hollow molded article main body 11 having a hollow double wall structure made up of a front surface wall 12 and a back surface wall 13; and skins 21 and 22 integrally bonded to outer surfaces of the front surface wall 12 and the back surface wall 13.

The hollow molded article main body 11 is made of, for example, a foamed resin.

A resin material is, for example, polyolefin-based resin. Examples of the polyolefin-based resin encompass polypropylene resin and polyethylene resin. In particular, a blend of a propylene homopolymer having a long-chain branch structure and a propylene homopolymer having a linear structure, the propylene homopolymers having different melt flow rates, is preferably used.

Further, as a thermoplastic constituting the hollow molded article main body 11, about 3 to 10 mass % of SBS resin (styrene-butadiene-styrene copolymer), SEBS resin (styrene-ethylene-butadiene-styrene copolymer), a mixture thereof, or the like may be mixed with the above-mentioned polyolefin-based resin. With this, it is possible to improve impact resistance of the skin-equipped hollow molded article 4.

In a case where the hollow molded article main body 11 is made of a foamed resin, an expansion ratio is arbitrary. For example, a foaming state preferably falls within the range of 1.1 to 3.5 times from the viewpoint of reduction in weight of the skin-equipped hollow molded article 4 and increase in stiffness thereof. In a case where the skin-equipped hollow molded article 4 is used as an automobile interior article such as a deck board, the hollow molded article main body 11 preferably has foamed cells because it is possible to obtain a sound insulation property against noise such as engine sound and a thermal insulation property against an increase in temperature inside the luggage space and a luggage box because of direct sunlight.

A reinforcing material may be embedded in a hollow portion of the hollow molded article main body 11. Alternatively, a reinforcing rib may be formed on the front surface wall 12 or the back surface wall 13. A reinforcing structure including an inner rib formed in the hollow portion from the back surface wall 13 to the front surface wall 12 can also be provided.

Between the skins 21 and 22 bonded to the hollow molded article main body 11, a so-called napped-type skin material having a comparatively large thickness is used for the first skin 21 bonded to the front surface wall 12. An example of the napped-type skin material encompasses a tufted carpet. Into the base cloth of the tufted carped, looped or cut pile yarns are inserted. In order for the pile yarns not to fall off, the back surface of the tufted carpet is coated with an adhesive to fix the pile yarns.

Meanwhile, a skin material having a thickness smaller than that of the first skin 21 is used for the second skin 22 bonded to the back surface wall 13. An arbitrary skin material can be used as long as the skin material used for the second skin 22 has a thickness smaller than that of the first skin 21. Examples of the skin material encompass natural fibers such as cotton, hemp, wool, and silk, regenerated fibers such as viscose rayon and cuprammonium rayon, semisynthetic fibers such as acetate and rayon, synthetic fibers such as nylon, polyester, acryl, vinylon, polypropylene, and polyurethane, and fiber sheets that can be obtained by processing those blend fibers, such as a knitted fabric, a textile fabric, and a nonwoven fabric. The skin material used for the second skin 22 may be a skin material having no nap.

The skin-equipped hollow molded article 4 having the above configuration is formed by subjecting a parison to blow molding and attaching a skin material at the same time. In blow molding, it is necessary to pinch off a parison. Thus, because of this pinching off, a parting line is formed on an outer side wall surface of the skin-equipped hollow molded article 4. Further, it is necessary to perform deburring processing after pinching off. Therefore, deburring for removing unnecessary resin and skin is performed by performing cutting along pinch-off portions.

By the deburring, a cut surface is exposed along the parting line. A resin cut surface exposed in this part largely degrades aesthetic appearance of a product. In view of this, a wall surface to which the first skin 21 is bonded protrudes outward more than a wall surface to which the second skin 22 is bonded so that the resin cut surface is inconspicuous in the parting line of the hollow molded article main body 11 of the skin-equipped hollow molded article 4 in this example.

Figure 3:
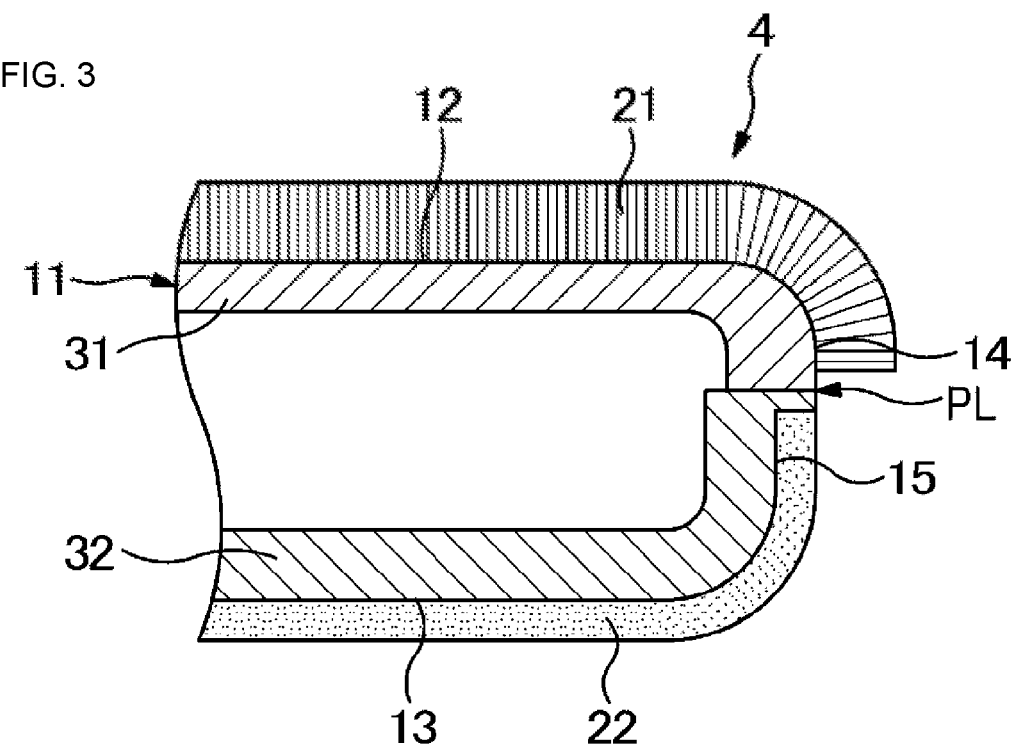
FIG. 3 is a main-part schematic cross-sectional view of the skin-equipped hollow molded article shown in FIG. 2.

FIG. 3 is an enlarged view of a portion in the vicinity of the pinch-off portions (parting line) of the skin-equipped hollow molded article 4 in this example. The hollow molded article main body 11 has a shape made up of a first molded body part 31 including the front surface wall 12 and a second molded body part 32 including the back surface wall 13. In addition, the hollow molded article main body 11 has a structure including the first molded body part 31 and the second molded body part 32 that are integrally formed by fusion in a parting line PL. The first skin 21 attached to the first molded body part 31 has a shape to cover the whole outer peripheral surface of the first molded body part 31 from the front surface wall 12 to an outer side wall surface 14 of the first molded body part 31. Similarly, the second skin 22 attached to the second molded body part 32 has a shape to cover the whole outer peripheral surface of the second molded body part 32 from the front surface wall 13 to an outer side wall surface 15 of the second molded body part 32.

In the above-mentioned configuration, the outer side wall surface 14 of the first molded body part 31 and the outer side wall surface 15 of the second molded body part 32 are generally processed to be flush with each other. In the skin-equipped hollow molded article 4 in this example, the outer side wall surface 14 of the first molded body part 31 protrudes outward more than the outer side wall surface 15 of the second molded body part 32. In this way, even in a case where the second skin 22 bonded to the second molded body part 32 is scraped at the time of deburring processing, resin (second molded body part 32) is prevented from being exposed because of this. In addition, the protruding first skin 21 hides the parting line. In this way, the cut surface formed by deburring is hardly seen, and therefore a favorable appearance state is maintained.

A protrusion amount of the outer side wall surface 14 of the first molded body part 31 only needs to be substantially the same as a thickness of the second skin 22. With this, the hollow molded article is formed so that the second skin 22 is included in a step, and therefore it is possible to prevent the second skin 22 from being cut at the time of deburring processing. As a matter of course, the present invention is not limited thereto, and an arbitrary protrusion amount may be set. However, when the protrusion amount is extremely small, the second skin 22 may be cut at the time of deburring. On the contrary, when the protrusion amount is extremely large, the step is conspicuous, and thus aesthetic appearance is degraded.

Figure 4:
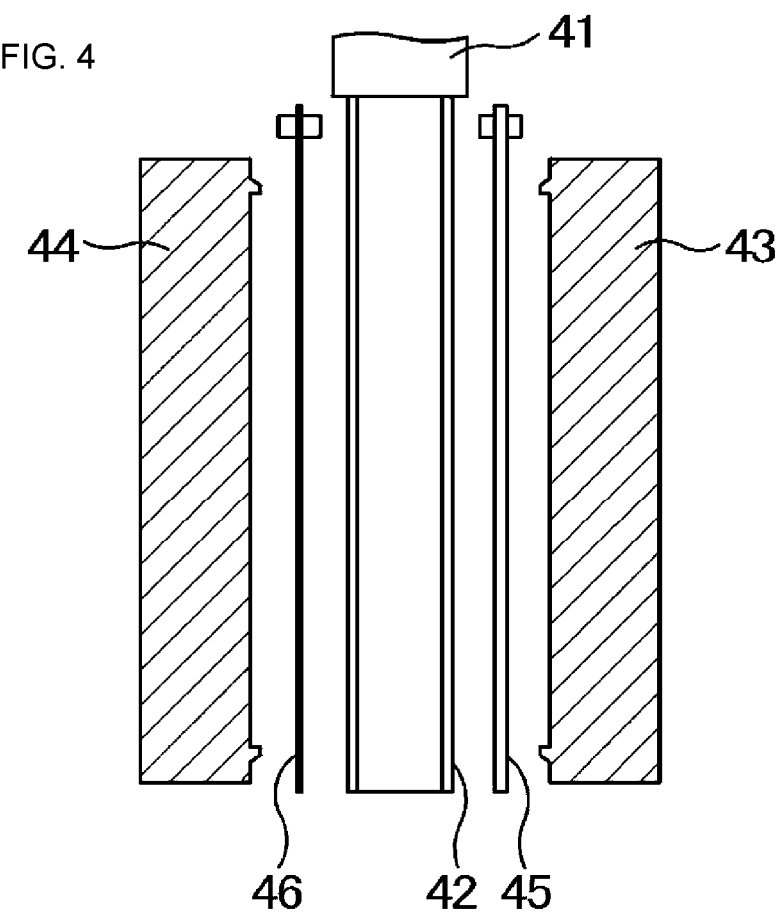
FIG. 4 is a schematic cross-sectional view of a blow molding step of a skin-equipped hollow molded article.

Next, a method of producing the skin-equipped hollow molded article 4 in this example will be described. The skin-equipped hollow molded article 4 in this example is formed by blow molding. As shown in FIG. 4, a tubular foamed parison 42 is melted and extruded from an extrusion head 41. The extruded parison 42 is placed together with skins 45 and 46 between split mold blocks 43 and 44. Thereafter, the split mold blocks 43 and 44 are clamped. The parison 42 is obtained by, for example, kneading and mixing polyolefin-based resin such as polypropylene to which a foaming agent such as a physical foaming agent, e.g., carbon dioxide, nitrogen gas, or the like or various publicly-known chemical foaming agents is added and then melting and extruding the polyolefin-based resin. The foamed parison 42 is melted and extruded at a high temperature of, for example, 185° C. or more and preferably 190° C. or more and is introduced as a pressurized fluid. With this, the parison 42 is extended along a shape of cavities of the split mold blocks 43 and 44. In this way, it is possible to mold the hollow molded article main body 11 having a desired expansion ratio of about 1.1 to 3.5 times without reducing a sudden expansion ratio due to breakage of cells.

In the blow molding, when pinch-off portions are shifted by the split mold blocks 43 and 44, the outer side wall surface 14 of the first molded body part 31 protrudes outward more than the outer side wall surface 15 of the second molded body part 32 in the molded hollow molded article main body 11. Specifically, shapes of the mold blocks are set so that the pinch-off portion of the split mold block 43 for molding the first molded body part 31 positions on an outer side of the pinch-off portion of the split mold block 44 for molding the second molded body part 32. Then, molding is performed by using those mold blocks. With this, the hollow molded article is formed so that the wall surface of the first molded body part 31 protrudes outward more than the wall surface of the second molded body part 32.

Figure 5:
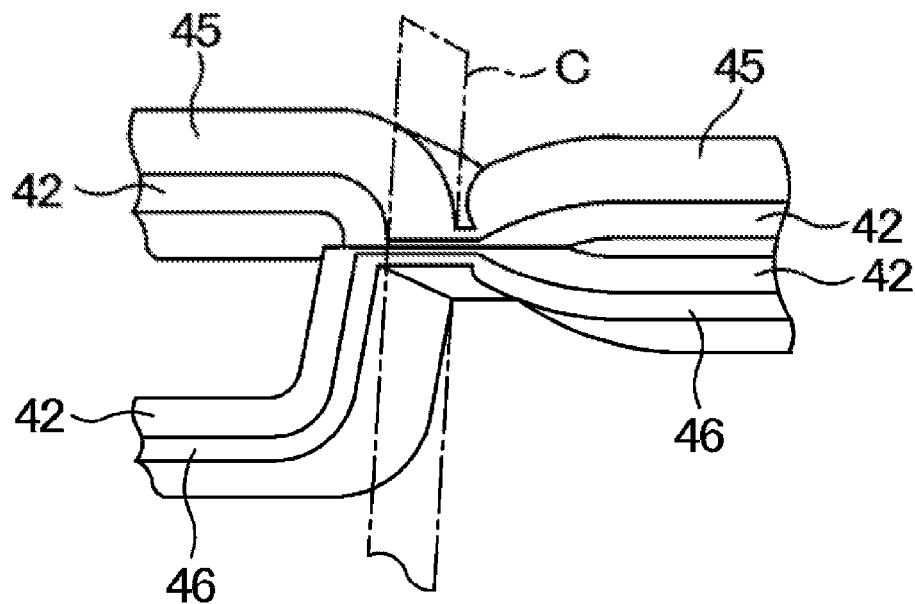
FIG. 5 schematically shows a cut surface obtained at the time of burr processing in production of the skin-equipped hollow molded article in this example.

FIG. 5 shows a state immediately after blow molding. After blow molding, the parison is pressed together with the skins at the pinch-off portions of the split mold blocks 43 and 44. In this way, the hollow molded article having the parison and the skins which are integrally formed by fusion is molded. At this time, unnecessary resin and skin remain as a burr on an outside of the pinch-off portions.

In view of this, deburring processing is performed after molding. An example of a cut surface C in the deburring processing at this time is shown by an alternate long and short dash line in FIG. 5. That is, a burr is cut along the outer side wall surface 14 of the first molded body part 31 protruding outward. In such a cut state, the cut surface C passes through an outside of a surface of the second skin 22 bonded to the outer side wall surface 15 of the second molded body part 32 formed on an inner side of the outer side wall surface 14. Therefore, the second skin 22 is not cut.

The first skin 21 is such that the cut surface C crosses an end portion thereof. In addition, the first skin 21 is a napped-type skin. Therefore, a cutting blade passes through a napped part. At this time, the napped part is in a state of escaping the cutting blade. Therefore, the napped part is hardly cut. Further, after cutting, resin of the pinch-off portions of the parison is exposed to the cut surface. However, the return of the napped part of the first skin 21 to the original state, coupled with a large thickness of the first skin 21, serves as a mask of the exposed resin. Thus, the cut surface (surface on which resin is exposed) is hardly conspicuous in terms of appearance.

Herein, a case where the outer side wall surface 15 of the second molded body part 32 protrudes outward more than the outer side wall surface 14 of the first molded body part 31 as in a conventional technique will be described for comparison.

A blow molding method is the same as a method in the above example. Shapes of the mold blocks are set so that the pinch-off portion of the split mold block 44 for molding the second molded body part 32 positions on the outer side of the pinch-off portion of the split mold block 43 for molding the first molded body part 31. By performing blow molding with the use of those mold blocks, a hollow molded body is molded so that the wall surface of the second molded body part 32 protrudes outward more than the wall surface of the first molded body part 31.

Figure 6:
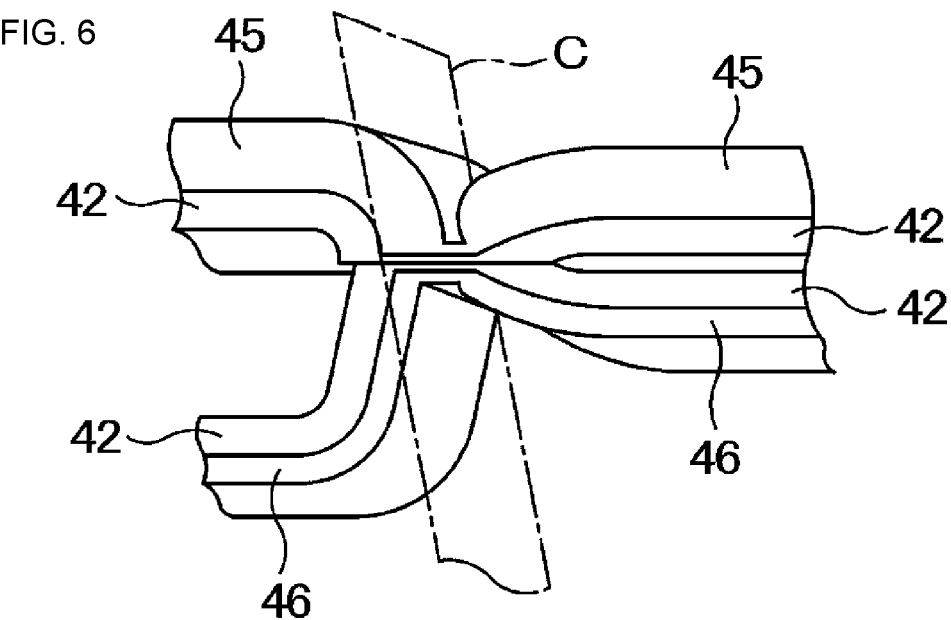
FIG. 6 schematically shows a cut surface obtained at the time of burr processing in production of a skin-equipped hollow molded article in a comparative example.
Figure 7:
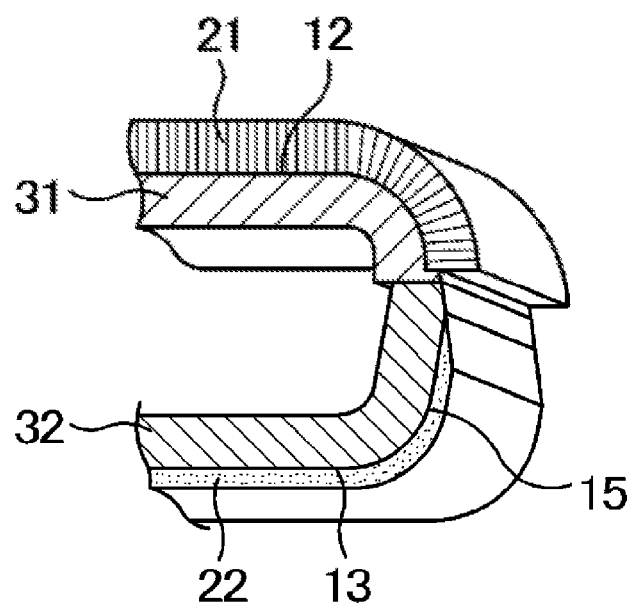
FIG. 7 is a main-part schematic perspective view of a broken-out part of a state after burr processing in production of the skin-equipped hollow molded article in the comparative example.

As shown in FIG. 6, the cut surface C in the deburring processing in this case is determined on the basis of a position of the pinch-off portion of the second molded body part 32. The second skin 22 positions on an outer side of the outer side wall surface 15 of the second molded body part 32. Therefore, when the cut surface C passes through an edge portion thereof, a part thereof is cut. Thus, as shown in FIG. 7, an area in which resin is exposed is increased, and therefore the first skin 21 cannot completely hide the exposed resin. This is a factor that largely degrades appearance.

In the skin-equipped hollow molded article and a method of producing the same in this example, the wall surface to which the first skin 21 is bonded protrudes outward more than the wall surface to which the second skin 22 is bonded as described above so that the resin cut surface is inconspicuous. Therefore, it is possible to achieve favorable appearance of a product. In this point, the skin-equipped hollow molded article and the method of producing the same in this example are greatly different from a conventional technique.

Hereinabove, an example to which the present invention is applied has been described. However, it is needless to say that the present invention is not limited to the above-mentioned example. It is possible to make various modifications within the scope of the present invention.

What is claimed is:

1. A skin-equipped hollow molded article, comprising:
    a hollow molded article main body made of a thermoplastic and having a first molded body part including a front surface wall, a second molded body part including a back surface wall, and an outer side wall surface of the front surface wall jointly formed with an outer side wall surface of the back surface wall; and
    skins integrally bonded to the respective front and back surface walls, wherein:
    a first skin bonded to the front surface wall is a napped-type skin;
    a second skin bonded to the back surface wall having a thickness smaller than a thickness of the first skin;
    wherein the outer side wall surface of the front surface wall to which the first skin is bonded protrudes outward more than the outer side wall surface of the back surface wall to which the second skin is bonded in a parting line formed on an outer side wall surface of the hollow molded article main body with the first molded body part and the second molded body part being integrally formed by fusion; and
    wherein the outer side wall surface of the front surface wall is provided with a cut surface formed along the parting line for deburring.

2. The skin-equipped hollow molded article according to claim 1,
    wherein the first skin is a tufted carpet.

3. A method of producing a skin-equipped hollow molded article including: a hollow molded article main body made of a thermoplastic and having a first molded body part including a front surface wall, a second molded body part including a back surface wall, and an outer side wall surface of the front surface wall jointly formed with an outer side wall surface of the back surface wall; and skins integrally bonded to the respective front and back surface walls, the method comprising:
    using a napped-type skin as a first skin bonded to the front surface wall;
    using a skin having a thickness smaller than a thickness of the first skin as a second skin bonded to the back surface wall;
    at the time of subjecting a parison to compression molding by placing the parison and the first and second skins between split mold blocks and clamping the split mold blocks, performing molding so that an outer side wall surface to which the first skin is bonded protrudes outward more than an outer side wall surface to which the second skin is bonded; and
    removing a burr along a parting line formed by integrally forming the first molded body part and the second molded body part by fusion.

4. The skin-equipped hollow molded article according to claim 1, wherein a protrusion amount of the outer side wall surface to which the first skin is bonded with respect to the outer side wall surface to which the second skin is bonded is substantially equal to a thickness of the second skin.

5. The method of producing a skin-equipped hollow molded article according to claim 3, wherein
    the skin-equipped hollow molded article includes
    a pinch-off portion of a split mold block for molding the first molded body part that is positioned on an outer side of a pinch-off portion of a split mold block for molding the second molded body part.

* * * * *